US 6,421,399 B1

(12) United States Patent
Avidor et al.

(10) Patent No.: US 6,421,399 B1
(45) Date of Patent: Jul. 16, 2002

(54) FREQUENCY AND PHASE ESTIMATION FOR MPSK SIGNALS

(75) Inventors: Dan Avidor, Ocean; Colin Alan Warwick, Holmdel, both of NJ (US)

(73) Assignee: Agere Systems Guardian Corporation, Allentown, PA (US)

( * ) Notice: Subject to any disclaimer, the term of this patent is extended or adjusted under 35 U.S.C. 154(b) by 0 days.

(21) Appl. No.: 09/035,533

(22) Filed: Mar. 5, 1998

(51) Int. Cl.[7] ............................................. H04L 27/22
(52) U.S. Cl. ....................... 375/329; 375/260; 375/343
(58) Field of Search ................................. 375/260, 269, 375/272, 279, 329, 334, 143, 148, 144, 150, 152, 273, 340, 341, 343; 329/300, 304

(56) References Cited

U.S. PATENT DOCUMENTS

| | | | | |
|---|---|---|---|---|
| 4,578,678 A | * | 3/1986 | Hurd ...................... 342/357.12 |
| 5,428,647 A | * | 6/1995 | Rasky et al. ................. 375/366 |
| 5,619,524 A | * | 4/1997 | Ling et al. ................... 375/200 |
| 5,627,861 A | * | 5/1997 | Kataoka ....................... 375/324 |
| 5,640,431 A | * | 6/1997 | Bruckert et al. ............. 375/344 |
| 5,804,741 A | * | 9/1998 | Freeman ................. 73/861.356 |
| 5,974,091 A | * | 10/1999 | Huff ............................. 375/265 |
| 6,061,406 A | * | 5/2000 | Carson et al. ............... 375/260 |
| 6,181,755 B1 | * | 1/2001 | Junell .......................... 375/362 |
| 6,269,118 B1 | * | 7/2001 | Hanna et al. ................ 375/233 |

* cited by examiner

Primary Examiner—Young T. Tse
(74) Attorney, Agent, or Firm—Darby & Darby

(57) ABSTRACT

A frequency and phase estimator simultaneously estimates the frequency and phase of an MPSK modulated signal with a frequency uncertainty range on the order of the symbol rate. The estimator defines a plurality of contiguous bands within the frequency uncertainty range of the signal, estimates the frequency to one of the bands, and utilizes the frequency estimate to derive a phase estimate. In a preferred embodiment, a plurality of signal samples of the frequency shifted signal in each of said bands are accumulated to produce a vector for each band, and the frequency estimate is selected in one of said bands, based upon the magnitude of the corresponding vector. The phase is estimated from the argument of the corresponding vector. The present invention is particularly suited for burst modems or TDMA systems, where frequency and phase estimates must be derived reliably from a limited number of incoming symbols at the beginning of each burst.

14 Claims, 7 Drawing Sheets

FREQUENCY AND PHASE ESTIMATION FOR MPSK SIGNALS

FIELD OF THE INVENTION

The present invention relates generally to data communications signal processing and, more specifically, concerns a frequency and phase estimation method and apparatus for an MPSK modulated carrier.

BACKGROUND OF THE INVENTION

Many types of data communications systems transfer information (e.g., audio or video signals) by modulating the information onto a carrier signal such as a sine wave. The carrier is modulated by varying one or more of its parameters, such as amplitude, frequency, or phase, according to the information being transmitted.

Phase shift keying ("PSK") modulation is frequently used to transmit digital data. PSK involves shifting the phase of the carrier according to the value of the digital data. For example, in binary PSK ("BPSK") the "zeros" in the digital data may be represented by a 180° shift in the phase of the carrier, while the "ones" in the digital data may be represented by no phase shift. Other degrees of phase shifting may be used. Quadrature PSK ("QPSK") involves phase shifts of 0°, 90°, 180° and 270°. PSK typically is referred to as "MPSK" where the "M" represents the number of phases.

After a transmitter sends an MSPK signal over the selected transmission medium (e.g., telephone lines or radio frequency waves), a receiver detects the phase changes in the accurately, the receiver must extract the unmodulated frequency and phase (commonly referred to as the reference frequency and phase) of the carrier from the received signal.

Traditionally, phase-locked loop ("PLL") circuits have been used to acquire carrier phase in many types of MPSK modems. PLLs are relatively easy to implement with either analog or digital technology and, in general, are considered to have good "steady state" performance.

However, PLLs are not effective for "bursty" transmissions. That is, transmissions where the signal is received in bursts (e.g., time-division multiple access, "TDMA," signals), rather than as a continuous signal. In many cases, PLLs cannot achieve fast phase acquisition with a high probability of accuracy due to a phenomenon known as "hang-up." Moreover, PLLs typically have a limited frequency acquisition range unless they are augmented with search schemes. These search schemes, however, introduce significant delay into the phase acquisition process.

Due to the above problems and the proliferation of digital technology and more powerful digital signal processors, many modern burst-mode modems acquire carrier phase using open-loop algorithms instead of PLLs. Open-loop solutions typically use a preamble at the beginning of each burst. A modem that processes burst-type transmissions that include a sufficiently long preamble may acquire phase using some form of correlator searching for a known preamble or using a decision directed solution. Some of these techniques are described in M. P. Fitz, "Equivocation in Nonlinear Digital Carrier Synchronizers," IEEE Transaction on Communications, vol. 39, no. 11, November 1991; and M. P. Fitz and W. C. Lindsey, "Decision-Directed Burst-Mode Carrier Synchronization Techniques," IEEE Transactions on Communications, vol. 40, no. 10, October 1992, the contents of which are hereby incorporated herein by reference.

The preamble technique is an unsuitable solution for many applications. For example, long preambles may take up a relatively large portion of the burst (particularly for short bursts). This reduces the effective bandwidth that is available for data transmission. Moreover, in some applications there is a need to acquire phase and frequency at any point during the burst or to reacquire it, once it is lost. Inherently, the preamble technique is ineffective for these applications.

Alternatively, a scheme based on a maximum likelihood algorithm may be employed. This scheme removes the data dependency of the received signal using a nonlinear operation. It has been shown for the case of an MPSK modulated carrier with an unknown phase that when the frequency is known (down to a small error) the phase can be efficiently estimated using a nonlinear algorithm. This technique may lead to results which are only moderately less accurate than those achievable by an optimal linear estimator operating on an unmodulated carrier. See, for example, the article by A. J. Viterbi and A. M. Viterbi entitled "Nonlinear Estimation of PSK-Modulated Carrier Phase with Application to Burst Digital Transmission," IEEE Transactions on Information Theory, vol. IT-29, no. 4, pp. 543–551, July 1983, the contents of which is hereby incorporated herein by reference.

The above techniques provide phase estimates for signals where the frequency is known. However, many applications require frequency and phase estimation for MPSK signals with a relatively wide frequency uncertainty range. For example, due to the instability of oscillators in the transmitters and receivers, the frequency of the received signal may be different than the expected frequency. Under certain circumstances, the frequency uncertainty range (i.e., range of possible frequencies of the received signal due to the instability) may be a significant fraction of the signal symbol rate. (In PSK, the information transfer rate is defined in terms of symbols per second.) Moreover, the frequency of the received signal typically will change over time due to the instability. Thus, the receiver must produce continuous phase and frequency estimates to maintain synchronization between the transmitter and receiver.

Various techniques have been proposed to determine the frequency of a signal within a known frequency uncertainty range. For example, it has been shown that a maximum-posterior-probability frequency estimator may consist of a bank of equally spaced envelope correlation detectors followed by "choose largest" logic. Viterbi, A. J., *Principles of Coherent Communications*, McGraw-Hill Book Co., New York, 1966, the contents of which is hereby incorporated herein by reference. However, this technique only dealt with an unmodulated sinusoid and did not detect the phase of the signal.

Thus, a need exists for an efficient frequency and phase estimator for signals that have a frequency uncertainty range that is a significant fraction of the symbol rate. Moreover, the estimator needs to produce estimates for each symbol following the initial acquisition of the signal and do so with high probability and within a relatively small number of symbols.

In accordance with a preferred embodiment of the invention, a frequency and phase estimator divides the frequency uncertainty range of the signal into a plurality of narrower frequency bands, the width of which is dictated by the required frequency resolution. For example, if the frequency uncertainty range covers 10 kHz, one band could cover the first 1 kHz in the range, another band could cover the second 1 kHz, and so forth. The estimator processes the signal and generates a frequency estimate by determining the band into which the incoming signal falls. The estimator then calculates a phase estimate.

The estimator shifts the frequency of, filters and samples the incoming signal, to produce a continuous sequence of discrete-time signal samples for each band. The frequency shift operation involves shifting the frequency of the incoming signal by an amount determined by the center frequency of each band relative to the center frequency of the uncertainty range. For example, when there are ten bands defined, the incoming signal is frequency shifted by a different amount for each band resulting in ten different shifts. Depending on the implementation, the incoming signal may be frequency shifted either before or after the signal is converted to a digital format by analog-to-digital conversion. Preferably, a pair of analog-to-digital converters is utilized. Each symbol in the incoming signal is sampled one or more times to produce the sequence of samples.

Next, the estimator removes the PSK modulation and accumulates the samples for each band. The modulation is removed by processing the samples with a nonlinear algorithm. A complex accumulator (the samples are complex numbers, i.e., vectors) then accumulates a predefined number of the demodulated samples. Typically, each of the accumulators processes samples corresponding to same incoming symbols.

To determine which band contains the actual frequency of the incoming signal, the estimator compares the magnitudes of the accumulated vectors. In general, the band with the largest accumulated vector is the one associated with the incoming frequency. Thus, the estimate of the signal frequency may be derived from the center frequency of the band.

The estimator calculates the reference phase of the received signal from the phase of the largest accumulated vector. Typically, this phase is adjusted to compensate for an anomaly known as equivocation.

In one embodiment, many of the above operations are implemented in a digital signal processor ("DSP"). In this case, provided the DSP has sufficient processing power, the processing operations for each band may be accomplished in series, i.e., one band at a time. Hence, the invention may be practiced using only a single DSP.

Thus, a system constructed according to the invention provides an efficient method of calculating the frequency error and the current phase of a MPSK modulated signal that has a relatively large frequency uncertainty range. As desired, the system produces a continuous stream of frequency and phase estimates. Moreover, the system produces good estimates after processing a relatively small number of symbols.

BRIEF DESCRIPTION OF THE DRAWINGS

These and other features of the invention will become apparent from the following description and claims, considered in view of the accompanying drawings, wherein similar references characters refer to similar elements throughout, and in which:

DESCRIPTION OF EXEMPLARY EMBODIMENTS

Figure 1:
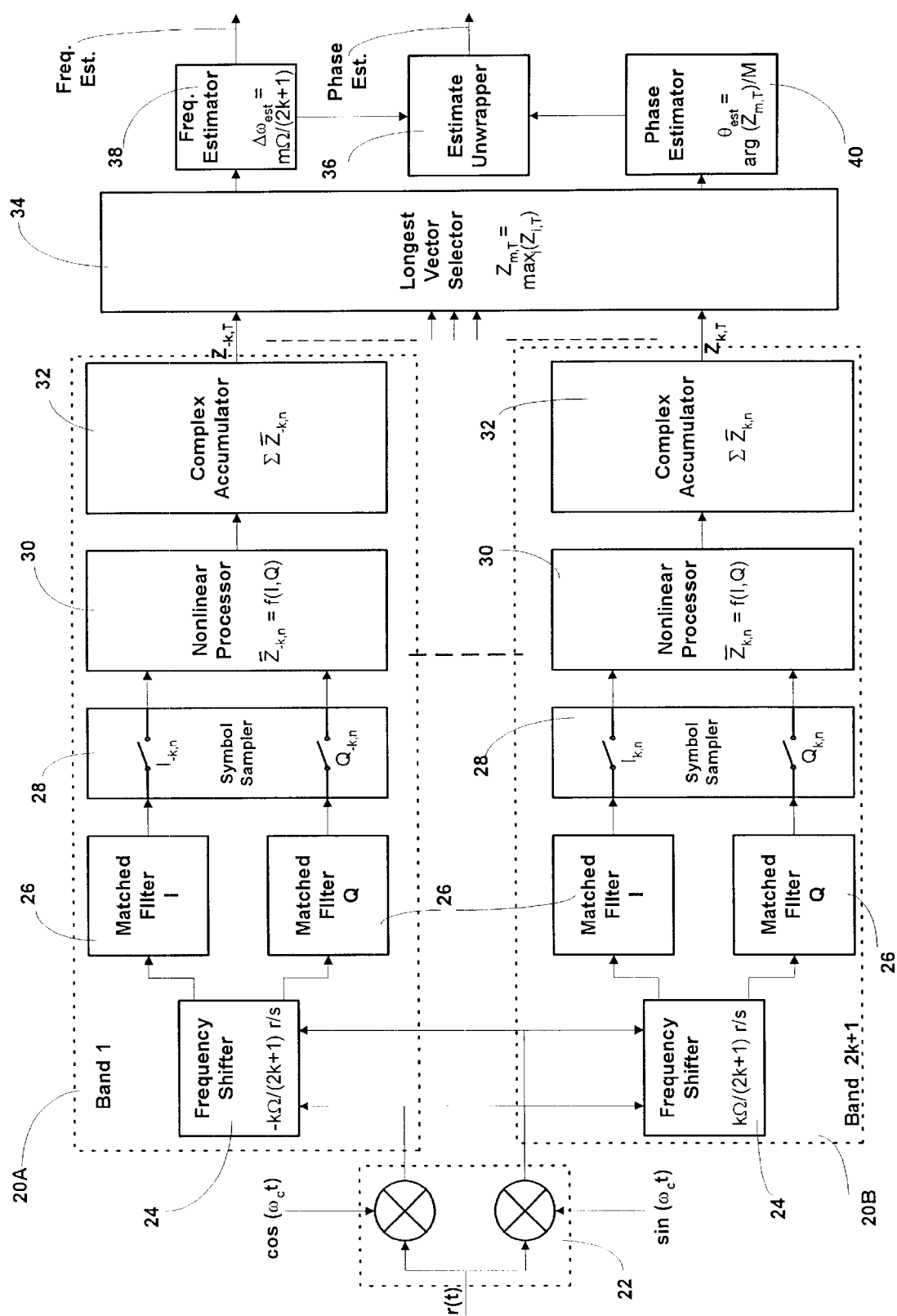
FIG. 1 is a functional block diagram illustrating one embodiment of a frequency and phase estimator embodying the present invention.

In FIG. 1, a frequency and phase estimator E processes a modulated signal r(t) (left) to generate continuous streams of frequency estimates and phase estimates (right). These estimates are used by a receiver (not shown) to recover information from the incoming signal. In accordance with the invention, the frequency uncertainty range of the signal is divided into several bands (e.g., band 1 20A through band 2k+1 20B) to accommodate signals that may have a relatively wide frequency uncertainty range.

The estimator E generates discrete-time samples for each of these bands and processes the samples to provide the estimates. Initially, a down converter 22 and a frequency rotator 24 frequency shift the incoming signal to provide signals for each band. To produce the discrete-time sequence of samples, matched filters 26 and symbol samplers 28 filter and sample each symbol within the rotated signals. Next, a nonlinear processor 30 applies a nonlinear algorithm to the samples to remove the modulation from the samples. A predefined number of the demodulated samples are accumulated in a complex accumulator 32. The complex accumulator 32 that contains the largest accumulated vector after a selected number of samples are accumulated identifies the band closest (in relative terms) to the frequency of the incoming signal. Thus, a longest vector selector 34 compares the accumulated vectors and identifies the associated band (e.g., band "m"). The estimator E then calculates the frequency estimate according to the frequency associated with this band. In addition, the reference phase of the signal is obtained from the argument of the accumulated vector for that band.

Figure 2:
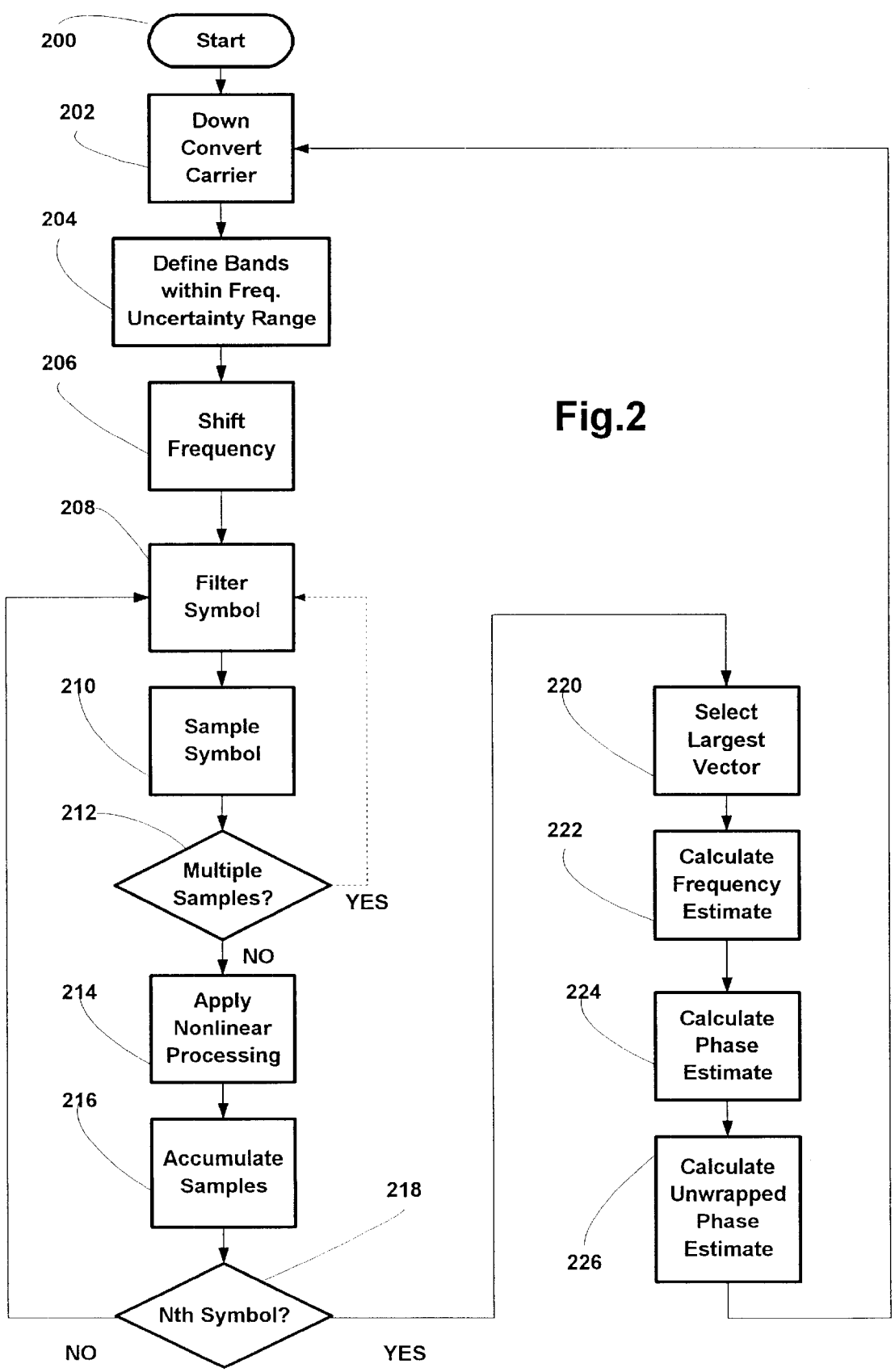
FIG. 2 is a flowchart illustrating operations that are performed by the apparatus of FIG. 1.

With the above overview in mind, FIG. 2 describes an exemplary frequency and phase process performed by the system of FIG. 1, beginning at block 200. At block 202 the baseband down converter 22 converts the modulated carrier signal r(t) to baseband.

To generate the estimates, the incoming signal is processed over a period which spans N consecutive symbols: $n=n_0, \ldots, n_0+N-1$. During the $n^{th}$ symbol time the received signal r(t) may be represented as:

$$r(t) = \sqrt{\frac{2E_s}{T}} \cos((\omega_c + \Delta\omega)t + \theta + \theta_n) + n(t); \tag{1}$$

$$(n-0.5)T < t < (n+0.5)T$$

In Equation 1, $\theta_n$, which is the information carrying parameter, may change from symbol to symbol subject to the following constraint:

$$\theta_n = i_n \left( \frac{2\Pi}{M} \right); i_n = 0.1 \ldots M-1 \quad (2)$$

where θ is a fixed, unknown phase. T is the duration of a symbol. $E_s$ is the energy of the signal per symbol.

The parameter n(t) is white Gaussian noise with one-sided power spectral density $N_0$. This means that the covariance function of the noise is:

$$R(\tau) = N_0/2\delta(\tau) \quad (3)$$

where δ ( ) is the Dirac delta function.

The signal to noise ratio ("SNR") of a signal is defined as: SNR=$2E_s/N_0$. This is the ratio between the peak instantaneous signal power and the mean noise power at the output of a filter matched to the signal in Equation 1 at the sampling instance. The term $E_b/N_0$ (a term commonly used in the art) is then:

$$E_b/N_0 = (E_s/N_0)/\text{Log}_2 M = (SNR/2)/\text{Log}_2 M \quad (4)$$

Typically, the precise frequency of the signal $\omega_c$ is not known due to, for example, the instability of the oscillators in the transmitter and receiver. Therefore, in accordance with the invention, an uncertainty region for $\omega_c$ is defined as a band of width W centered around $\omega_c$ (block 204). The band W is divided into 2k+1 equal bands centered around $\omega_c$:

$$\omega_c - k\frac{\Omega}{2k+1}, \ldots, \omega_c, \ldots, \omega_c + k\frac{\Omega}{2k+1} \quad (5)$$

At block 206, the frequency rotator 24 (e.g., a down converter) associated with each band shifts the frequency of the in-phase ("I") and quadrature-phase ("Q") symbols produced by the baseband down converter 22. Each frequency rotator 24 in the bank of 2k+1 staggered frequency rotators 24 is tuned to the center frequency of one of the bands.

Figure 3:
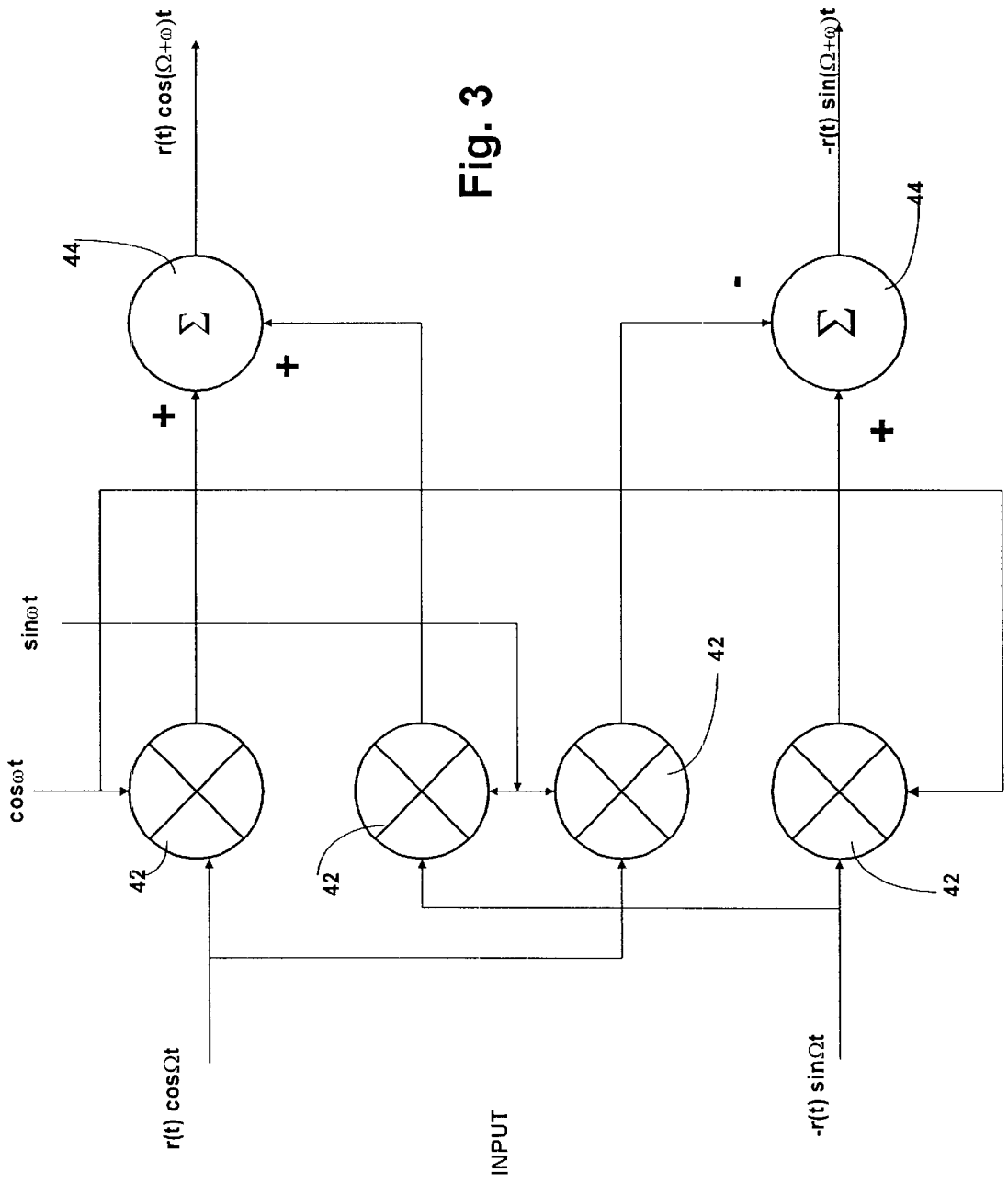
FIG. 3 is a schematic diagram illustrating a preferred embodiment of a frequency shifter that may be used in the embodiment of FIG. 1.

FIG. 3 is a schematic of a simplified circuit that rotates a signal with a frequency of Ω radians per second by "ω" radians per second. Multipliers 42 generate products of the incoming signals that are summed by adders 44 to produce a signal with the desired frequency (i.e., Ω+ω). Many variation of this technique are possible, some of which are discussed below. In addition, it would be apparent to one skilled in the art that the operations of the baseband converter 22 may be combined with the operations of the frequency rotators 24, if desired.

Referring again to FIG. 2, at block 208 the outputs of each rotator 24 are filtered by a pair of matched filters 26. Assuming a "square" unfiltered symbol shape, a good choice for the matched filter 26 is an integrator.

The filtered output is sampled to generate the discrete-time sequence of samples (block 210). For example, the integrator (not shown) is reset at $t=(n-0.5)T_s$. The symbol sampler 28 samples the output of the integrator at $t=(n+0.5)T_s$. The $n^{th}$ sample of the in-phase $i^{th}$ frequency rotator 24, which is tuned to:

$$\omega + i\frac{\Omega}{2k+1} \quad (6)$$

is:

$$I_i(n) = \sqrt{E_s \frac{T}{2}} \cos\left(\left(\Delta\omega - i\frac{\Omega}{2k+1}\right)nT + \theta + \theta_n\right) \quad (7)$$

$$\text{Sinc}\frac{T}{2}\left(\Delta\omega - i\frac{\Omega}{2k+1}\right) + n_{I,i}(n)$$

where $\text{Sinc}(x) \triangleq \text{Sin}(x)/x$ and the quadrature sample is:

$$Q_i(n) = \sqrt{E_s \frac{T}{2}} \sin\left(\left(\Delta\omega - i\frac{\Omega}{2k+1}\right)nT + \theta + \theta_n\right) \quad (8)$$

$$\text{Sinc}\frac{T}{2}\left(\Delta\omega - i\frac{\Omega}{2k+1}\right) + n_{Q,i}(n)$$

where $n_{I,i}(n) = n_{Q,i}(n)$ are independent Gaussian random variables with $\sigma^2_{I,i}(n) = \sigma^2_{Q,i}(n) = N_0 T/4$. i=-k, . . . , k.

Normalizing the peak signal power and the noise variance by dividing both by $E_s T/2$ (which is the maximum squared signal peak amplitude), the peak amplitude of the signal is then "1" and the variance of the noise components is:

$$\sigma_I^2 = \sigma_Q^2 = \frac{N_0 T}{4} \frac{2}{E_s T} = \frac{N_0}{2E_s} \quad (9)$$

Hence:

$$\sigma_I = \sigma_Q = \sqrt{\frac{N_0}{2E_s}} = \frac{1}{\sqrt{SNR}} \quad (10)$$

The noise samples, taken simultaneously at the end of every symbol, are in general correlated. The elements of the covariance matrix of the noise samples of the 2k+1 channels may be derived through known procedures. The covariance is a fixed (i.e., independent of n) 2k+1 by 2k+1 matrix. It is normalized by multiplication by $2/(E_s/T)$.

At block 212, if each symbol is to be sampled more than once, the above process is repeated (with some modification). The dashed line from block 212 represents one possible multi-sampling method. Multi-sampling is discussed in more detail below.

After the estimator E generates the discrete-time samples, a nonlinear demodulator 30 removes the data dependency of the samples (block 214). Defining Φ(n) as the argument (i.e., angle) of the vector $X_i(n) = I_i(n) + jQ_i(n)$. In the absence of noise:

$$\varphi_i(n) = \arg\{X_i(n)\} \quad (11)$$

$$= \text{Tan}^{-1}\left(\text{Tan}\left[\left(\Delta\omega - i\frac{\Omega}{2k+1}\right)nT + \theta + \theta_n\right]\right)$$

$$= \left(\Delta\omega - i\frac{\Omega}{2k+1}\right)nT + \theta + \theta_n$$

It is apparent that Φ(n) is dependent on $\theta_n$. As mentioned above, $\theta_n$ is the phase shift due to the information that modulated the carrier. To retrieve the reference phase of the carrier, the effects of $\theta_n$ are eliminated.

To eliminate the unknown $\theta_n$, the nonlinear demodulator calculates $Z_i(n) = F\{|X_i(n)|\} \text{Exp}\{j\psi_i(n)\}$, where the nonlinear function F{ } is discussed below and:

$$\psi_i(n) = M_{\Phi i}(n) \quad (12)$$

Since $M\theta_n$ is an integer multiple of $2\pi$, $Z_i(n)$ is independent of $\theta_n$. Moreover, it is not necessary to preserve the correct quadrant when calculating $\Phi_i(n)$ because practical values of M are even. For example, when $X_i(n)$ and $Q_i(n)$ are both negative, $\Phi_i(n)$ could be chosen in the first quadrant, etc.

Regarding, the choice for the function F{ }, functions of the form: $F\{x\}=x^\alpha$ have been studied for a phase estimator where the frequency is assumed known or where the frequency error is known to be very small. See the Viterbi article referenced above and B. E. Paden, "A Matched Nonlinearity for Phase Estimation of a PSK-Modulated Carrier," IEEE Transactions on Information Theory, vol. IT-32, no. 3, pp. 419–422, May 1986, the contents of which is hereby incorporated herein by reference. The conclusion derived from some theoretical analysis and simulations for M=4 is that for $E_b/N_0$>6 dB, $\alpha$=1, or in other words, $F\{x\}=x$ may be preferred. For $E_b/N_0$<6 dB, $\alpha$=2 may be better, and for asymptotically low values of $E_b/N_0$, $\alpha$=4 appears to be preferred. The variable $\alpha$ plays an additional role because it modifies the effect of the Sinc( ) terms in EquationS 7 and 8. When $\alpha$>0, vectors accumulated by channels further away from the correct one have that part of their magnitude (which is related to the signal) diminished. This phenomenon is meaningful only for large values of $\Omega T$. Moreover, the gain that can be obtained from using $\alpha$>0 is small and, in practical situations when $E_b/N_0$>0 dB and $\Omega T<\pi/2$, may not warrant the additional processing load.

At block 216, the complex accumulator 32 calculates the magnitude of vector Z(n) and adds it to the accumulator 32. This process starts with the $n_0^{th}$ symbol and continues for N consecutive symbols (block 218). The best estimate of the phase may be achieved for the center sample when N is odd. See the Viterbi article referenced above and D. C. Rife and R. R. Boorstyn, "Single-Tone Parameter Estimation from Discrete-Time Observations," IEEE Transactions on Information Theory. vol. IT-20, no. 5, pp. 591–598, September 1974, the contents of which is hereby incorporated herein by reference. Thus, $n_0$ is selected as: $n_0$=−(N−1)/2. As shown in FIG. 1, 2k+1 vectors $Z_i(n)$, i=−k, . . . , 0, . . . , k, are calculated (one for each band) and added to the corresponding accumulator 32.

Blocks 206 to 218 in FIG. 2 describe operations that may be performed for each of the bands (e.g., band 1 20A) in FIG. 1. In the embodiment of FIG. 1, these operations typically would be performed in parallel. However, they could be performed one band (or a few bands) at a time. One example of serial processing is discussed below.

When N vectors have been added to all the accumulators 32, the accumulator 32 holding the longest vector (largest in absolute value) is selected (block 220). In other words, let $$Z_{i,T} \triangleq \sum_{n=-(N-1)/2}^{(N-1)/2} Z_i(n); \quad i = k, \ldots, 0, \ldots k \quad (13)$$

be the final content of accumulator i. Zm,T is then the largest vector:

$$Z_{m,T}=\max_i\{Z_{i,T}\} \quad (14)$$

At block 222, a frequency estimate calculator 38 generates $\Delta\omega$ from the index of the selected band:

$$\Delta\omega_{est}=m\{\Omega/(2k+1)\} \quad (15)$$

At block 224, a phase estimate calculator 40 generates $\theta$ from the argument of the longest vector:

$$\theta_{est}=\text{argument}\{Z_{m,T}\}/M \quad (16)$$

If argument $\{Z_{m,T}\}/M$ spans a range $-\pi$ to $\pi$, the phase estimate will be confined to a range $-\pi/M$ to $\pi/M$. Although the actual phase of the transmitter progresses (if $\Delta\omega\neq 0$) and may drift in the entire band of width $2\pi$, the string of estimates will be broken into segments that span one sector only. The source of this problem is the multiplication of the phase $\Phi$ by M to yield $\psi$ (which is interpreted by the algorithm as $\psi$ Modulo $2\pi$) followed by the division by M in Equation 16. Moreover, the algorithm suffers from so-called "equivocation," an anomaly described and analyzed in the 1991 article by Fitz referenced above.

At block 226, an estimate unwrapper 36 handles this problem as follows. $\theta(j)$ is defined as the argument of $Z_{m,T}(j)$, i.e., the argument of the longest vector calculated by the $j^{th}$ application of the algorithm. Then, $\theta_{est}(1)=\theta(1)/M$ (recall that the first phase estimate is arbitrary anyway). Next, $\theta_p(j+1)$ is defined as:

$$\Theta_p(j+1)=\Theta(j)+\Delta\omega_{est}(j)T; \ j=1,2,3, \ldots \quad (17)$$

$\theta_p(j+1)$ is the predicted value of $\theta(j+1)$ based on $\theta(j)$ and the frequency estimate performed during the $j^{th}$ application of the algorithm. $\theta_a(j+1)$ is defined as:

$$\Theta_a(j+1)=\Theta(j+1)+k2\pi \quad (18)$$

where k is an integer defined by:

$$|\Theta(j+1)+k2\pi-\Theta_p(j+1)|\leq|\Theta(j+1)+i2\pi-\Theta_p(j+1)| \quad (19)$$

for any integer i≠k. Then:

$$\Theta(j+1)=\Theta_a(j+1) \quad (20)$$

and $$\Theta_{est}(j+1) = MOD_{2\pi}\left[\Theta_{est}(j) + \frac{\Theta(j+1) - \Theta(j)}{M}\right] \quad (21)$$

With the above definition, $\theta_p(j)$ and $\theta(j)$ can have any values. To prevent indefinitely large (or small) values, modulo $M2\pi$ values may be used instead.

The above technique generates a "continuous" sequence of unwrapped phase estimates as long as $|\theta(j+1)-\theta_p(j+1)|<\pi$. Whenever this condition is violated due to excessive noise, the reconstructed sequence $\theta_{est}$ is likely to jump to a different sector. It then continues normal operation until another error causes a second jump. At sufficiently high SNRs, these jumps are infrequent.

Even if the tracking is done perfectly, however, the ambiguity remains because the initial decision of where to place $\theta_{est}(1)$ is arbitrary. However, this is an ambiguity that it typically present in coherent MPSK receivers. There are known ways to deal with this problem. See, for example, the Viterbi article referenced above.

As in any algorithm that processes sampled data, the above algorithm is subject to aliasing. For example, assuming the noise is negligibly small and the unknown frequency error is precisely on channel i, i.e.:

$$\Delta\omega - i\frac{\Omega}{2k+1} = 0 \quad (22)$$

For any j such that:

$$\left[\Delta\omega - j\frac{\Omega}{2k+1}\right]T = 12\frac{\pi}{M}; \ l = \ldots -2, -1, 1, 2, \ldots \quad (23)$$

the phase of the vector $X_j(n)=I_j(n)+jQ_j(n)$ differs from $X_i(n)$ by an integer multiple of $(2\pi)/M$. When the algorithm multiplies the phase by M, the resultant phase is indistinguishable from arg{$X_i(n)$}. Therefore, all the vectors produced by those channels add in-phase, the same as those of channel i. Only the Sinc( ) term, which affects the amplitude of the accumulated vectors (for $\alpha \neq 0$), and the noise determine which accumulator ends up the largest.

The algorithm, therefore, tends to generate multiple peaks (as represented by a graph of the absolute value of the final contents of the 2k+1 accumulators). The above may happen when:

$$|i-j|\Omega \frac{T}{2k+1} \geq \frac{2\pi}{M} \quad (24)$$

or, since $|i-j| \leq 2k$, if $$\Omega T \geq \frac{2\pi}{M} 2k + \frac{1}{2k} \simeq \frac{2\pi}{M} \quad (25)$$

Thus, aliasing may occur when $\Omega T > (2\pi/M)$. The Sinc( ) term has only a small effect when $\Omega T = (2\pi/M)$ and $M \geq 4$. For example, in one test with M=4 and $\alpha$=2, the magnitude of the (closest) false peak falls by approximately 2 dB in comparison with the correct peak.

One solution for the situation when $\Omega > 2\pi/M$ is to sample more than once per symbol. The following example illustrates this for the M=4 case. Referring to FIG. 2, at block 208, the estimator integrates over the first half of each symbol. At block 210, the estimator samples the result, then resets (dumps) the integrator and repeats the operations of blocks 208 and 210 for the second half of the symbol. This produces twice as many samples, 2(2k+1)2N altogether, for a sequence of N symbols. The estimator multiplies the argument over every vector by four before summing them all up as before.

By sampling twice per symbol, $\Omega$ may be twice as large as before and the estimator E still avoids aliasing. In fact, $\Omega$ can be increased by P if the estimator E uses P samples. However, some loss in SNR will result from this approach.

The magnitude of this loss can be simulated. For the case of two samples per symbol, the signal and the random noise components for all the samples are calculated. First, $I_{i,T/2}(n)$ and $Q_{i,T/2}(n)$, the in-phase and quadrature signals accumulated by the $i^{th}$ channel during the first half of the $n^{th}$ symbol (from t=nT−(T/2) to nT) are calculated. Then, the samples taken at the end of the symbol ($I_{i,T}(n)$ and $Q_{i,T}(n)$) are calculated (from t=nt to nT+(T/2)). Similarly, the noise samples ($n_{I,i,T/2}(n)$ and $n_{Q,i,T/2}(n)$) taken at the middle of the $n^{th}$ symbol (from t=nT−(T/2) to nT) are calculated as are those taken at the end of the $n^{th}$ symbol (from t=nt to nT+(T/2)).

Comparing the frequency estimation results for the single and double sampling case, for 0.1 radians/symbol as a criterion, a SNR loss of approximately 1.3 dB has been calculated. As for the phase estimation and 0.1 radian as a criterion, a loss of approximately 1 dB has been calculated.

Figure 4:
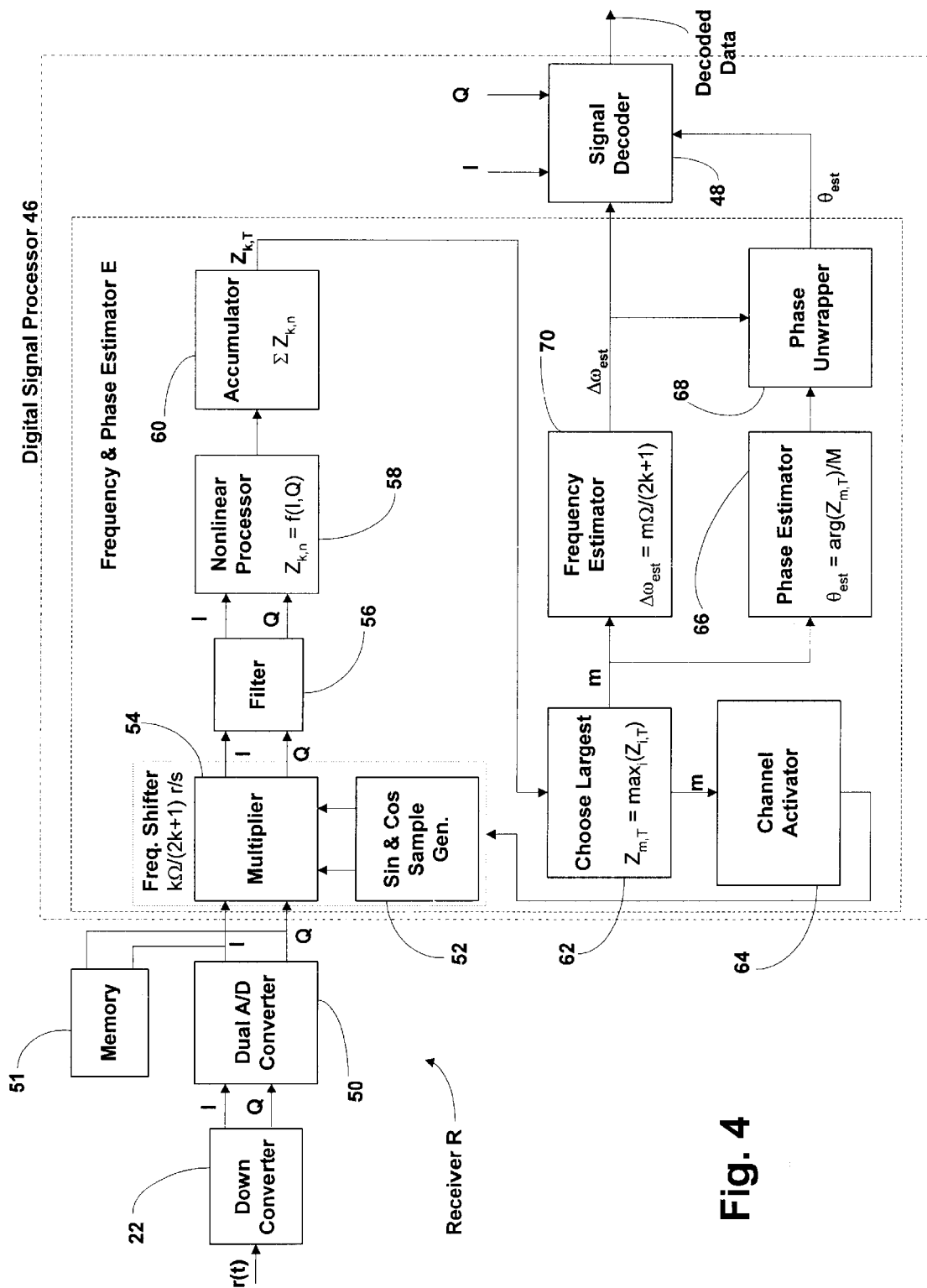
FIG. 4 is a functional block diagram illustrating one embodiment of a signal receiver embodying the invention, the receiver including a digital signal processor constructed.

Referring to FIG. 4, an alternative embodiment of the invention that uses a digital signal processor ("DSP") 46 is shown. FIG. 4 also depicts a typical implementation where the estimator is incorporated into a receiver R. The receiver R includes a signal decoder 48 that uses the frequency and phase estimates to decode the modulated information from the incoming signal.

Referring briefly to FIG. 1, it may be seen that except for a common "front-end" and a common "back-end" the estimator includes 2k+1 "channels" (i.e., bands) which differ only in the amount (and sign) of "rotation" that they perform in front of the matched filters 26 (e.g., integrators). Depending on the actual set of parameters (e.g., the symbol rate) and availability of a fast DSP device, it may be possible to perform the calculations for all 2k+1 channels serially in the digital domain, excluding possibly the first (common) downconverter 22.

Figure 5:
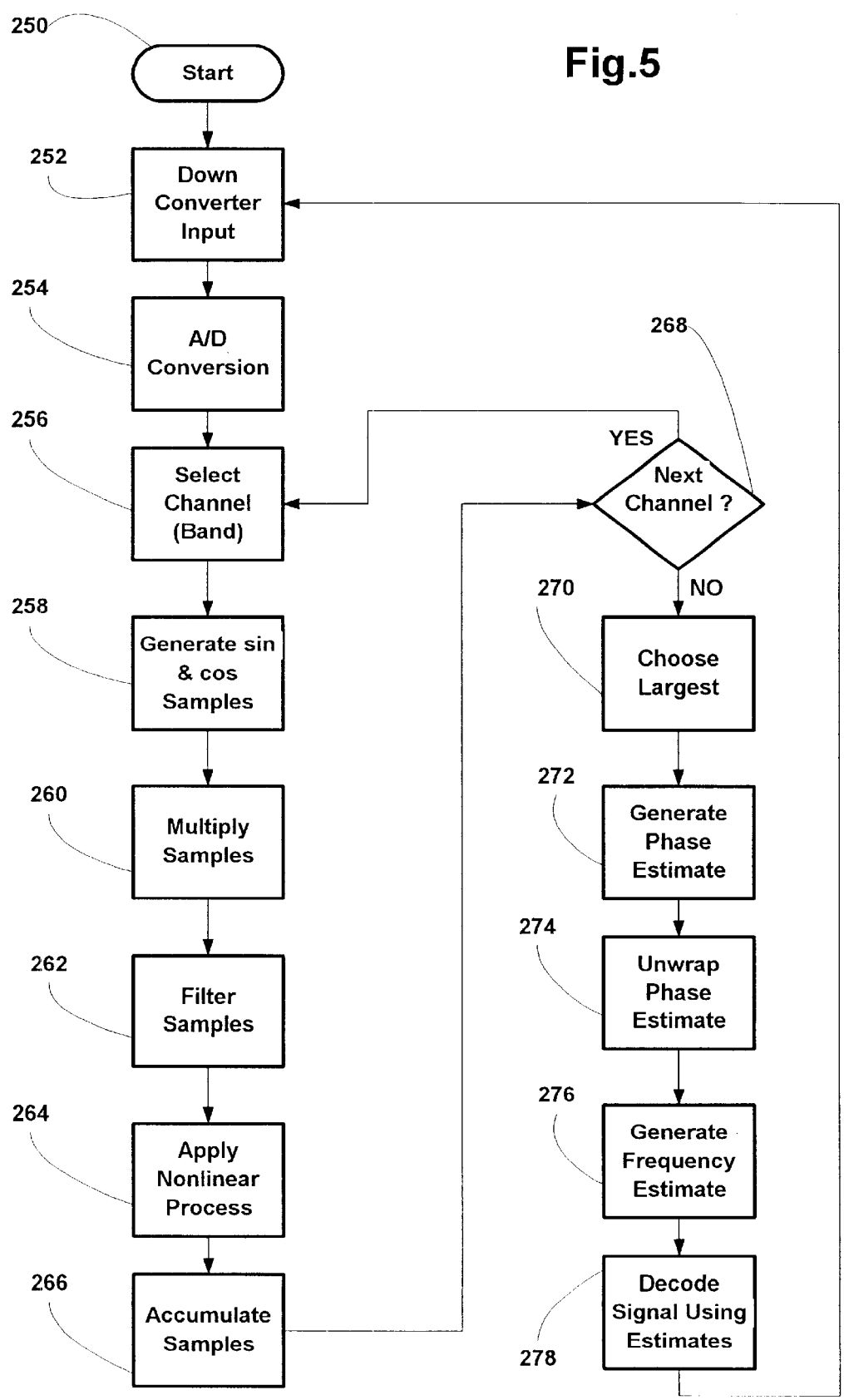
FIG. 5 is a flowchart illustrating operations that are performed by the device of FIG. 4.

An exemplary operation of the embodiment of FIG. 4 is treated in FIG. 5 beginning at block 250. At block 252, the incoming signal is down converted to baseband as discussed above in conjunction with FIG. 1.

A dual analog to digital converter ("ADC") 50 at the quadrature outputs of the common down converter 22 converts the analog signals to digital data streams (block 254). That is, the ADC 50 samples the in-phase and quadrature symbols. As discussed above, each symbol may be sampled multiple times (e.g., "x" times per symbol). These samples may be used by the DSP 46 in "real-time" or stored in a memory 51 to be used as needed by the DSP 46.

Next, the estimator E selects a channel to process (block 256). Initially, the estimator E will process signals for each of the channels (as discussed below). However, in many practical situations, it is not necessary to continue to perform all the calculations in real time. When the frequency is known to be relatively stable, it is possible to estimate the frequency even when the actual calculations last many times the duration of N symbols. This operation must be repeated from time to time, of course, to track frequency drifts. Once the frequency is known, the phase can be derived by activating only one channel, the one that corresponds to the correct frequency.

At block 258, to provide the desired frequency rotation, a sample generator 52 produces samples of the sine and cosine functions for each channel. A different set of samples will be generated for each channel. At block 260, a multiplier 54 multiplies samples of the incoming signal by the samples of the sine and cosine for the selected channel.

In the embodiment of FIG. 4, the filters are implemented in the digital domain (block 262). In some implementations, these filters may employ a filter design other than a simple integrator. For example, finite impulse response ("FIR") and infinite impulse response ("IIR") filters. In practice, the rotation operation may be considered part of the filtering operation. As mentioned above, depending on the available computing power, the rotating, filtering, nonlinear processor (demodulator) 58 (block 264) and accumulator 60 (block 266) operations can be performed serially. In general, these basic operations as performed by the DSP 46 are similar to those discussed above in conjunction with FIG. 1.

After the above operations are completed for each channel (block 268), the choose largest logic 62 (e.g., choose largest vector) calculates the largest vector (block 270). As discussed above in conjunction with block 256, a channel activator 64 may store the identity of the selected channel (e.g., "m") and control the selection of the channel in future phase estimation operations. In this case, once the channel has been selected, the operation of blocks 268 and 270 may be omitted until the frequency estimate is recalculated.

The basic operations of the remaining steps performed by the DSP are similar to those discussed above in conjunction with FIG. 1. Thus, a phase estimator 66 calculates a phase estimate (block 272). A phase unwrapper 68 processes this estimate to generate an unwrapped phase estimate (block 274). A frequency estimator 70 generates a frequency estimate (block 276). At block 278, the latter two estimates are sent to the signal decoder as discussed above.

The DSP embodiment of FIGS. 4 and 5 thus provides an attractive method of practicing the invention. In particular, it may be implemented using only one down converter, thereby possibly reducing the cost of the system.

Several aspects of the operation of the embodiments discussed above should be noted. In general, the frequency estimate is biased. The probability density function of $\Delta\omega_{est}$ is symmetric around $\Delta\omega$ only when $\Delta\omega=0$. Recall that there are exactly $2k+1$ discrete frequency outcomes. When $\Delta\omega$ is not equal to any possible outcome, an error must occur and the outcome is biased toward the closest possible outcome. When $\Omega/k$ is small enough so that this phenomenon can be ignored, the algorithm is still biased when $\Delta\omega\neq 0$, i.e., when $\Delta\omega$ is not at the center of the frequency uncertainty range. When $\Delta\omega$ is closer to one end of the frequency uncertainty range, the estimate is biased toward the other end. This last effect diminishes as the values of the SNRs increase, and increases when $\Delta\omega$ is very close to the band edge. A similar situation has been reported in the Rife and Boorstyn article referenced above.

The performance of the device may depend on the frequency off-set between the received signal and the "closest" channel. If i is the index of the closest channel, then $[\Delta\omega-i\Omega/(2k+1)]T$ is the phase shift between successive vectors accumulated by channel i. Thus, given a frequency resolution of $\Omega T/(2k+1)$ radians/sample, there is a maximum value of N (e.g., $N_m$) beyond which the performance will start dropping. With asymptotically low noise $N_m$ corresponds to:

$$N_m[\Delta\omega-i\Omega/(2k+1)]T\approx\pi \quad (26)$$

For practical values of SNR, N should be chosen lower than that.

In general, the accuracy of the frequency estimate depends on the resolution of the bands. That is, the narrower the band, the more accurate the frequency estimate. This accuracy comes at the expense, however, of added cost (e.g., more DSP operations per received symbol).

Figure 6:
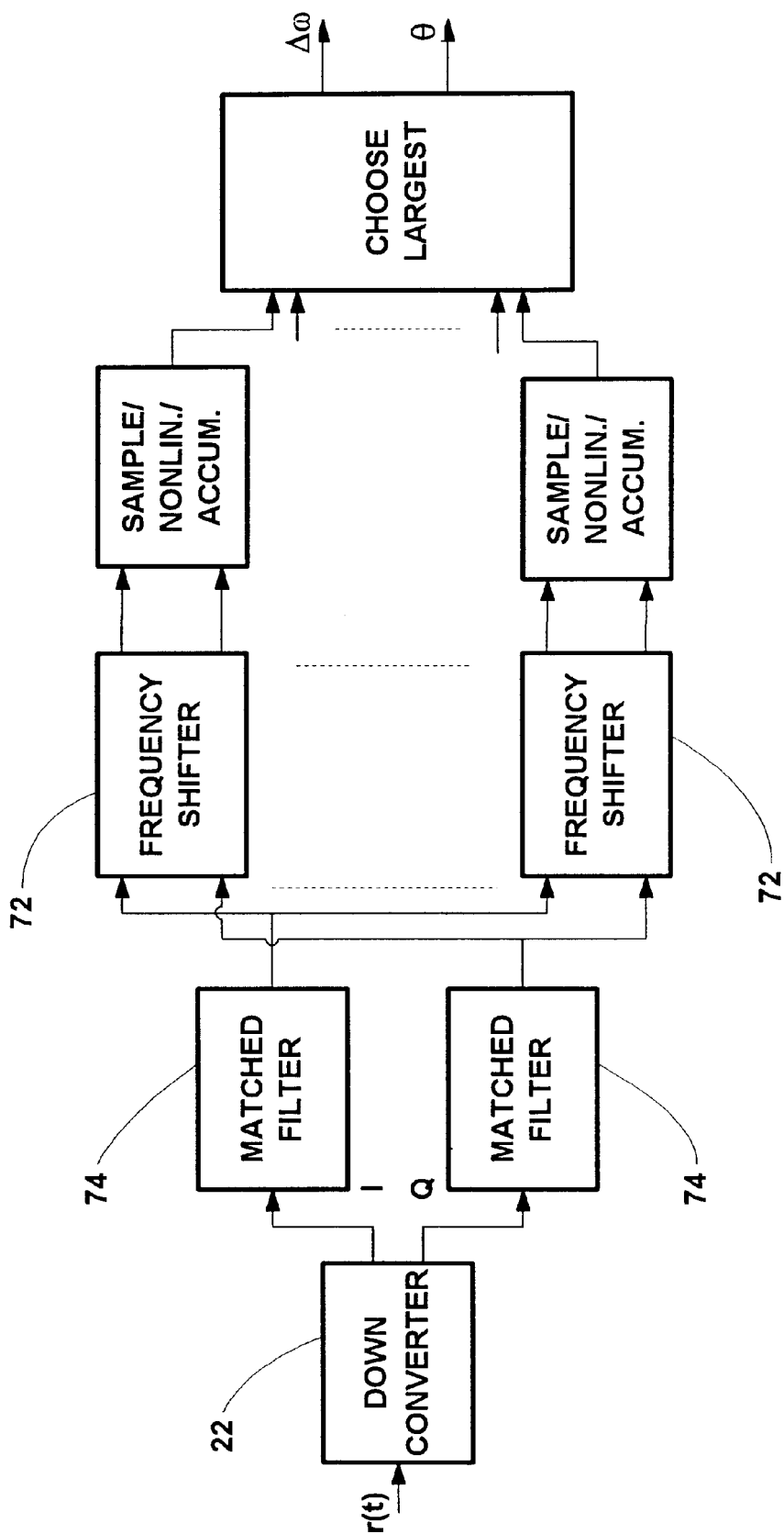
FIG. 6 is a block diagram illustrating another frequency and phase estimator embodying the invention.

FIG. 6 illustrates the performance of various embodiments of the invention in comparison with the Cramer-Rao lower bound. Specifically, this figure compares graphically the standard deviation of the phase estimate as a function of signal-to-noise ratio, $2E_s/N_0$. on the variance of the estimates follows. These results were obtained by computer simulation using MATLAB. To bypass the difficult task of calculating the bound, the approach described in the Viterbi article of making comparisons with the known bound for the M=1 case may be adopted. More specifically, the simulated results obtained for the variance of the phase estimation error using this algorithm are compared with the Cramer-Rao lower bound for a single sinusoid with known frequency, duration NT and energy $NE_s$. For this particular case, the bound is:

$$\text{var}\{\theta_{est}\}\geq \frac{1}{N(2E_s/N_0)} \quad (27)$$

Figure 7:
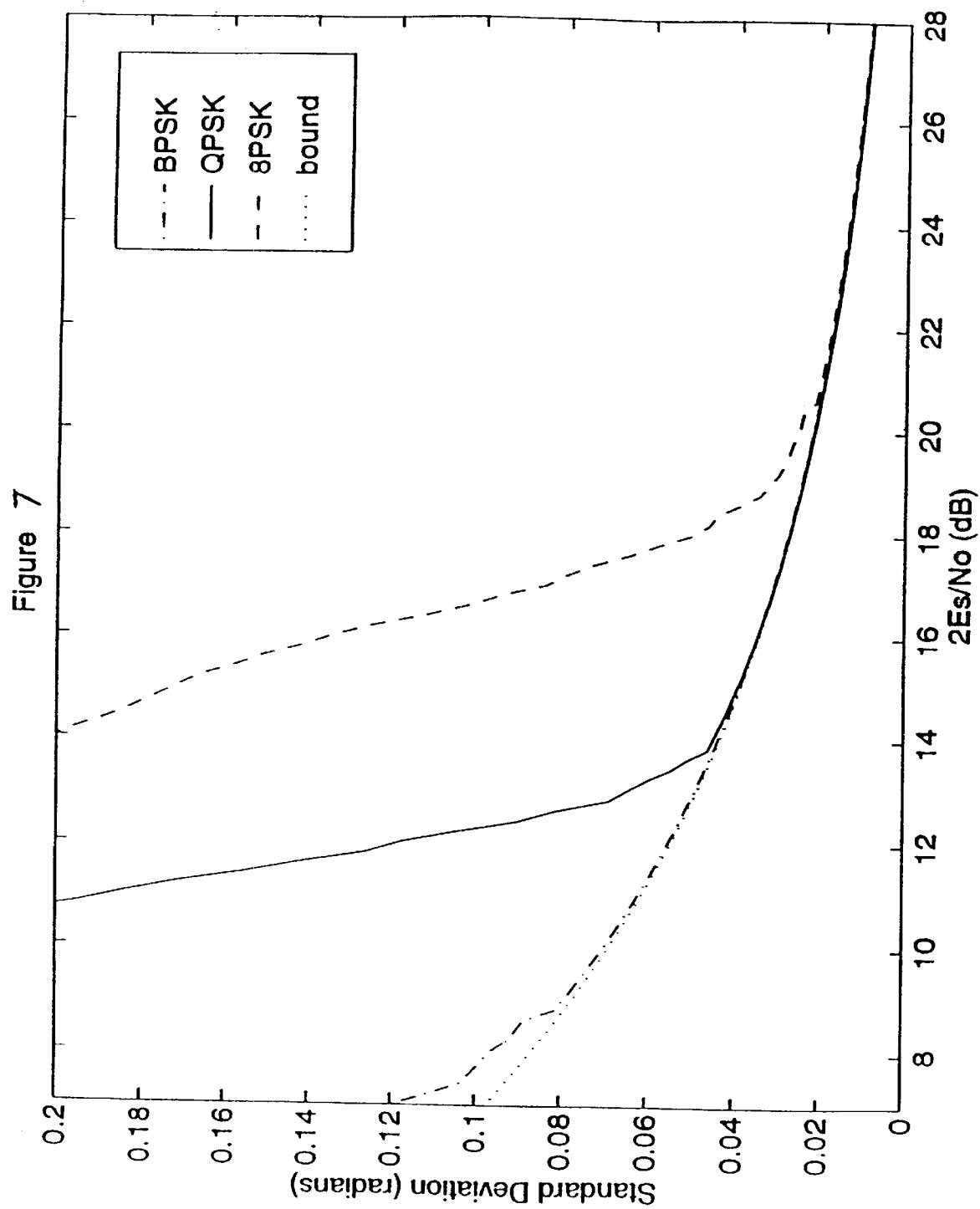
FIG. 7 is a graphic illustration of the relationship between the standard deviation of the phase estimator error and signal-to-noise ratio for BPSK, QPSK, and 8PSK, as well as the Cramer-Rao lower bound.

The simulations of FIG. 6 utilized these operational parameters: k=40; $\alpha=1$; $\Omega T=2.025$ radians/symbol; one sample per symbol; and $\Delta\omega T$ is uniformly distributed in the range 0 to 0.025 radians/symbol. FIG. 7 shows that the signal-to-noise threshold of the M=8 curve is higher than that of M=4, while M=2 has the lowest threshold. Above the threshold, the estimator approaches the bound. When the signal-to-noise ratio decreases below the threshold, $\sigma_\theta$ climbs and saturates at a level for M=8 which is higher than that for M=4 and highest for M=2. When the signal-to-noise ratio approaches zero, the distribution of the phase estimates produced by the algorithm approaches a uniform distribution over the sector $-\pi/M$ to $\pi/M$, and therefore the phase estimate variance approaches $(\pi/M)^2/3$, which is a function of M.

Simulations of the invention were accomplished as follows. For each run, a signal, consisting of N random symbols, may be generated. Then, for each symbol, $2N(2k+1)$ noise samples ($4N(2k+1)$ for the two symbols per sample case) may be generated. These noise samples represent the noise components appearing at the output of the $2(2k+1)$ matched filters (see FIG. 1) at each sampling instance. The noise samples are all statistically independent for different sampling times, but should be mutually chosen correctly for every one sampling time so as to match the covariance matrix, which is a function of n.

Y is defined as a random row vector containing $2(2k+1)$ components ($4(k+1)$ components for the two samples per second case), where each component is a statistically independent, identically distributed Gaussian random variable with zero mean and variance equal to one. [R] is defined as the required covariance matrix. The linear transformation: $X=Y[R]^{1/2}$ generates a row random vector X such that $E\{X'X\}=[R]$, where X' is the transpose of X.

As noted above, the Sinc( ) terms in EquationS 7 and 8 depart significantly from 1 only for values of $\Omega T$ exceeding $\pi/2$ radian/symbol. When $\Omega T$ is smaller than $\pi/2$, the bank of matched filters may be replaced with two filters, one for the I channel and one for the Q channel. This configuration is depicted in FIG. 6. The bank of rotators 72 are placed at the output of the filters 74.

The structure and method taught by the invention may also be used to estimate the frequency and phase of a differentially MPSK modulated carrier. In addition, with minor modifications, the teachings of the invention may be used for modulation schemes such as IS-136, where the phase of each successive symbol is incremented at the transmitter by a fixed known amount, independent of the phase shifts attributable to the modulating data.

The embodiments described above illustrate that the invention may be practiced in a wide variety of configurations and the functions described above may be distributed among various components. For example, the functions for each band (channel) may be incorporated into one or more devices. The system may be expanded to accommodate different uncertainty ranges and different degrees of resolution for the bands. A bank of DSPs may be used to process the channels in parallel.

Typically, the DSP operations would be implemented as software routines installed on and executed by a DSP device such as a "DSP-2000" available from Lucent Technologies. Alternatively, one or more of the above operations could be implemented in another hardware device such as a microprocessor, a custom integrated circuit, etc. These design selections would depend on the requirements of the specific implementation.

From the above, it may be seen that the invention provides an effective frequency and phase estimator that provides a number of advantages over conventional systems. For example, the estimator automatically adjusts to changes in the frequency of the incoming signal. Continuous estimates are provided. No preamble is needed. Read-only-memories are not employed for the nonlinear algorithm.

While certain specific embodiments of the invention are disclosed as typical, the invention is not limited to these particular forms, but rather is applicable broadly to all such variations as fall within the scope of the appended claims. To those skilled in the art to which the invention pertains many modifications and adaptations will occur. For example, various methods of down converting and frequency rotating may be used in practicing the invention. A variety of methods may be used for the sampling, filtering and accumulating operations. A number of nonlinear methods may be used to remove the modulation. Similarly, various frequency calculating, phase calculating and unwrapping algorithms may be utilized. Thus, the specific structures and methods discussed in detail above are merely illustrative of a few specific embodiments of the invention.

What is claimed is:

1. A method for estimating the frequency and phase of a PSK modulated signal having a frequency uncertainty range, said method comprising the steps of:

frequency shifting said signal to a frequency band within said frequency uncertainty range;

performing a nonlinear operation on said frequency shifted signal to demodulate said frequency shifted signal;

generating a frequency estimate of said signal according to said frequency shifted signal; and generating a phase estimate of said signal according to said demodulated signal.

2. The method according to claim 1 further including the step of frequency shifting said PSK modulated signal to at least one additional frequency band within said frequency uncertainty range.

3. The method according to claim 2 further including the steps of:

accumulating a plurality of signal samples of the frequency shifted signal in each of said bands; and selecting the frequency estimate in one of said bands, based upon the result of said accumulating step.

4. The method according to claim 3 wherein said frequency estimate comprises a frequency deviation ($\Delta\omega_{est}$) defined by:

$$\Delta\omega_{est}=(m\Omega)/(2k+1)$$

where m is an index associated with said one selected band, $\Omega$ defines said uncertainty range and 2k+1 defines a number of said bands.

5. The method according to claim 3 wherein the accumulating step produces a vector corresponding to each band and the selecting step selects that band corresponding to the longest vector.

6. The method according to claim 5 wherein said phase estimate ($\theta_{est}$) is determined as:

$$\theta_{est}=\arg(z_{m,T})/M$$

where $\arg(z_{m,T})$ is the argument of the longest vector and M is the number of phase possibilities in the PSK modulated signal.

7. The method according to claim 1 further including the step of down-converting said demodulated signal to a baseband signal.

8. The method according to claim 1 further including the step of unwrapping said phase estimate.

9. The method according to claim 1 wherein a single frequency band is selected for estimating said phase.

10. The method according to claim 1 further including the step of taking a plurality of samples of a symbol of said demodulated signal.

11. The method according to claim 1 further including the steps of:

performing an analog-to-digital conversion on said demodulated signal to generate a digital sample of said signal;

generating a sequence of samples representing the frequency associated with said band; and multiplying said digital sample with said sample with said frequency representing samples.

12. In a system for estimating the frequency and phase of a modulated input signal having a frequency uncertainty range, the combination of:

a frequency shifter for frequency shifting said input signal to a frequency band within said frequency uncertainty range;

a nonlinear processor responsive to said frequency shifted signal to remove modulation therefrom, creating a demodulated signal;

a frequency estimator responsive to said frequency shifted signal and generating a frequency estimate of said input signal; and a phase estimator responsive to said demodulated signal and generating a phase estimate of said input signal.

13. The combination according to claim 12 further comprising at least one down-converter for converting said input signal to a baseband signal.

14. The combination according to claim 12 further comprising at least one additional frequency shifter for frequency shifting said input signal to at least one other frequency band within said frequency uncertainty range.

* * * * *